United States Patent
Jones et al.

(10) Patent No.: US 9,183,126 B2
(45) Date of Patent: Nov. 10, 2015

(54) MEMORY RANGE PREFERRED SIZES AND OUT-OF-BOUNDS COUNTS

(75) Inventors: Blake A. Jones, Oakland, CA (US); Jonathan William Adams, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 731 days.

(21) Appl. No.: 13/460,712

(22) Filed: Apr. 30, 2012

(65) Prior Publication Data

US 2013/0290670 A1 Oct. 31, 2013

(51) Int. Cl.
G06F 12/02 (2006.01)

(52) U.S. Cl.
CPC ...... *G06F 12/0223* (2013.01); *G06F 2212/652* (2013.01)

(58) Field of Classification Search
None
See application file for complete search history.

*Primary Examiner* — Charles Rones
*Assistant Examiner* — Ryan Dare
(74) *Attorney, Agent, or Firm* — Osha · Liang LLP

(57) ABSTRACT

A system that includes a memory, a tilelet data structure entry, a first tile freelist, and an allocation subsystem. The memory includes a first tilelet on a first tile. The tilelet data structure entry includes a first tilelet preferred pagesize assigned to a first value. The first tile freelist for the first tile includes a first tile in-bounds page freelist, and a first tile out-of-bounds page freelist. The allocation subsystem is configured to detect that a first physical page is freed, store, in the first tile in-bounds page freelist, a first page data structure, detect that a second physical page is freed, store, in the first tile out-of-bounds page freelist, a second page data structure, and coalesce the memory using the second page and at least one of the physical pages associated with the plurality of out-of-bounds page data structures into a third physical page.

20 Claims, 16 Drawing Sheets

MEMORY RANGE PREFERRED SIZES AND OUT-OF-BOUNDS COUNTS

BACKGROUND

Computer memory is allocated to programs executing on the computer in units referred to as physical pages. Each physical page is mapped to one or more virtual pages that stores data used by the program. Because memory on computer systems is constantly in short supply, one of the primary functions of modern computers is managing the allocation of physical pages to programs. This task can be made more complex as the types of memory requested differs from program to program, within a single program, and over time.

SUMMARY

In general, in one aspect, the invention relates to a system that includes a memory, a tilelet data structure entry, a first tile freelist, and an allocation subsystem. The memory includes a first tilelet on a first tile. The tilelet data structure entry includes a first tilelet preferred pagesize assigned to a first value. The first tile freelist for the first tile includes a first tile in-bounds page freelist, and a first tile out-of-bounds page freelist comprising a plurality of out-of-bounds page data structures, wherein each of the plurality of out-of-bounds page data structures is associated with a physical page. The allocation subsystem configured to detect that a first physical page on the first tilelet is freed, store, in the first tile in-bounds page freelist, a first page data structure corresponding to the first physical page based on a determination that a size of the first physical page matches the first tilelet preferred pagesize, detect that a second physical page on the first tilelet is freed, store, in the first tile out-of-bounds page freelist, a second page data structure corresponding to the second physical page based on a determination that a size of the second physical page does not match the first tilelet preferred pagesize, and coalesce the memory using the second page and at least one of the plurality of physical pages associated with the plurality of out-of-bounds page data structures into a third physical page, wherein a size of the third physical page matches the first tilelet preferred pagesize.

In general, in one aspect, the invention relates to a method for managing memory on a system. The method includes detecting that a first physical page on a first tilelet is freed, wherein the first tilelet is on a first tile within the memory, wherein the first tilelet is associated with a first tilelet data structure entry comprising a first tilelet preferred pagesize assigned to a first value, and wherein the first tile is associated with a first tile freelist and includes a first tile in-bounds page freelist, and a first tile out-of-bounds page freelist comprising a plurality of out-of-bounds page data structures, wherein each of the plurality of out-of-bounds page data structures is associated with a physical page. The method further includes storing, in the first tile in-bounds page freelist, a first page data structure corresponding to the first physical page based on a determination that a size of the first physical page matches the first tilelet preferred pagesize, detecting that a second physical page on the first tilelet is freed, storing, in the first tile out-of-bounds page freelist, a second page data structure corresponding to the second physical page based on a determination that a size of the second physical page does not match the first tilelet preferred pagesize, and coalescing the memory using the second page and at least one of the plurality of physical pages associated with the plurality of out-of-bounds page data structures into a third physical page, wherein a size of the third physical page matches the first tilelet preferred pagesize.

In general, in one aspect, the invention relates to a computer readable medium comprising instructions that, when executed by a processor, perform a method for managing memory on a system. The method includes detecting that a first physical page on a first tilelet is freed, wherein the first tilelet is on a first tile within the memory, wherein the first tilelet is associated with a first tilelet data structure entry comprising a first tilelet preferred pagesize assigned to a first value, and wherein the first tile is associated with a first tile freelist and includes a first tile in-bounds page freelist, and a first tile out-of-bounds page freelist comprising a plurality of out-of-bounds page data structures, wherein each of the plurality of out-of-bounds page data structures is associated with a physical page. The method further includes storing, in the first tile in-bounds page freelist, a first page data structure corresponding to the first physical page based on a determination that a size of the first physical page matches the first tilelet preferred pagesize, detecting that a second physical page on the first tilelet is freed, storing, in the first tile out-of-bounds page freelist, a second page data structure corresponding to the second physical page based on a determination that a size of the second physical page does not match the first tilelet preferred pagesize, and coalescing the memory using the second page and at least one of the plurality of physical pages associated with the plurality of out-of-bounds page data structures into a third physical page, wherein a size of the third physical page matches the first tilelet preferred pagesize.

Other aspects of the invention will be apparent from the following description and the appended claims.

DETAILED DESCRIPTION

Figure 1:
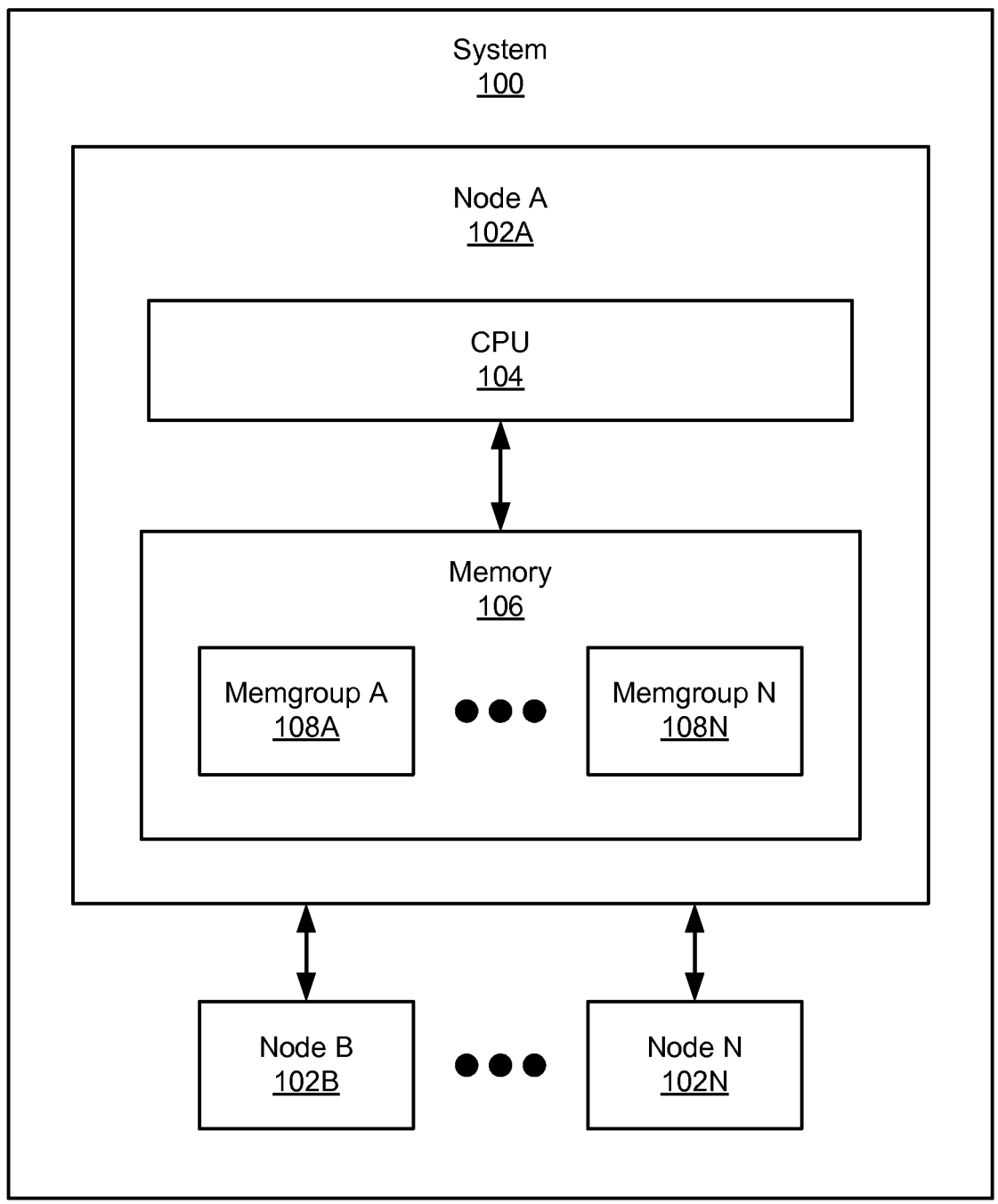
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing memory on a system. Specifically, embodiments of the invention may be used to manage memory using preferred page sizes applied to different regions of physical memory.

Some modern computer systems manage regions of memory separately, instead of as a single undivided unit. For example, a non-uniform memory access (NUMA) architecture system may include a number of nodes, each including memory which may be managed separately from the memory on other nodes of the system. Further, memory on each node may be further separated according to the ability of the system to supply or reduce power to that portion of memory on a node. For example, four gigabytes of random access memory (RAM) located on a single node may include functionality to independently control the amount of power provided to each one gigabyte portion.

Accordingly, all memory on a system may be grouped according to characteristics of the memory. In one or more embodiments of the invention, such characteristics include the location of the memory, such as on which system node the memory resides. Memory characteristics also include the power management domain of the portion of memory. The power management domain refers to portions of memory that are supplied power as a single unit. Portions of memory that share memory characteristics are referred to as memgroups.

Such memgroups of physical memory may be further divided into tiles of physical memory. Each tile of physical memory may represent a portion of the overall memory on the system. A tile may be further divided into tilelets, and each tilelet may include a number of pages of varying size. For example, a tile of one megabyte of memory may be divided into eight tilelets of 128 kilo bytes (kB) of contiguous memory. Continuing with the example, each 128 kB tilelet may be organized into one 64 kB page, one 32 kB page, one 16 kB page, and two 8 kB pages. Pages of physical memory on each tilelet are allocated for use by a thread, which then (via the virtual memory manager (VMM)) maps the physical page to a virtual page. Virtual pages are then stored in and swapped out of that physical page location in the tilelet.

Once the thread is no longer using a page of physical memory, the VMM frees the memory for use by another thread. The VMM maintains a freelist of all freed pages on the system. Each freed page has a corresponding page data structure in the freelist describing at least the size and location of the page.

FIG. 1 shows a diagram of a system in accordance with one or more embodiments of the invention. As shown in FIG. 1, the system (100) includes node A (102A) operatively connected to a plurality of nodes (node B (102B) and node N (102N)). Node A (102A) includes a central processing unit (CPU) (104) and memory (106). The memory (106) includes multiple memgroups (memgroup A (108A), memgroup N (108N)). Each of the other nodes in the system (node B (102B), node N (102N)) may include substantially similar elements as those depicted in node A (102A).

In one or more embodiments of the invention, the system architecture depicted in FIG. 1 may operate as a system with non-uniform memory access (NUMA) architecture. In one or more embodiments of the invention, the links between the nodes (e.g., node A (102A), node B (102B), node N (102N)) may be implemented as a computer bus or data link capable of transferring data between nodes on a NUMA architecture system. Further, processes may execute on one node (e.g., node A (102A), node B (102B), node N (102N)) while accessing memory locations on a different node. Further, each node (e.g., node A (102A), node B (102B), node N (102N)) on the system may include only a CPU (104) without memory (106), or memory (106) without a CPU (104).

In one or more embodiments of the invention, memory (106) on a node is divided into memgroups (memgroup A (108A), memgroup N (108N)). In one embodiment of the invention, a memgroup (memgroup A (108A), memgroup N (108N)) is a group of memory units (e.g., memory cells, bits, bytes) on the system (100) that share memory characteristics. In one embodiment of the invention, all memory in a memgroup (memgroup A (108A), memgroup N (108N)) is located on a single node (e.g., node A (102A)). All memory in a memgroup may also be part of the same power management domain. Contiguous ranges of memory units within each memgroup (memgroup A (108A), memgroup N (108N)) are organized into tilelets (not shown). As used herein, a contiguous range of memory, a contiguous region of memory, and contiguous pages of memory refer to a set of memory units in a sequence uninterrupted by other memory units that are not in the set. Further detail regarding memgroups is provided in FIG. 2.

Figure 2:
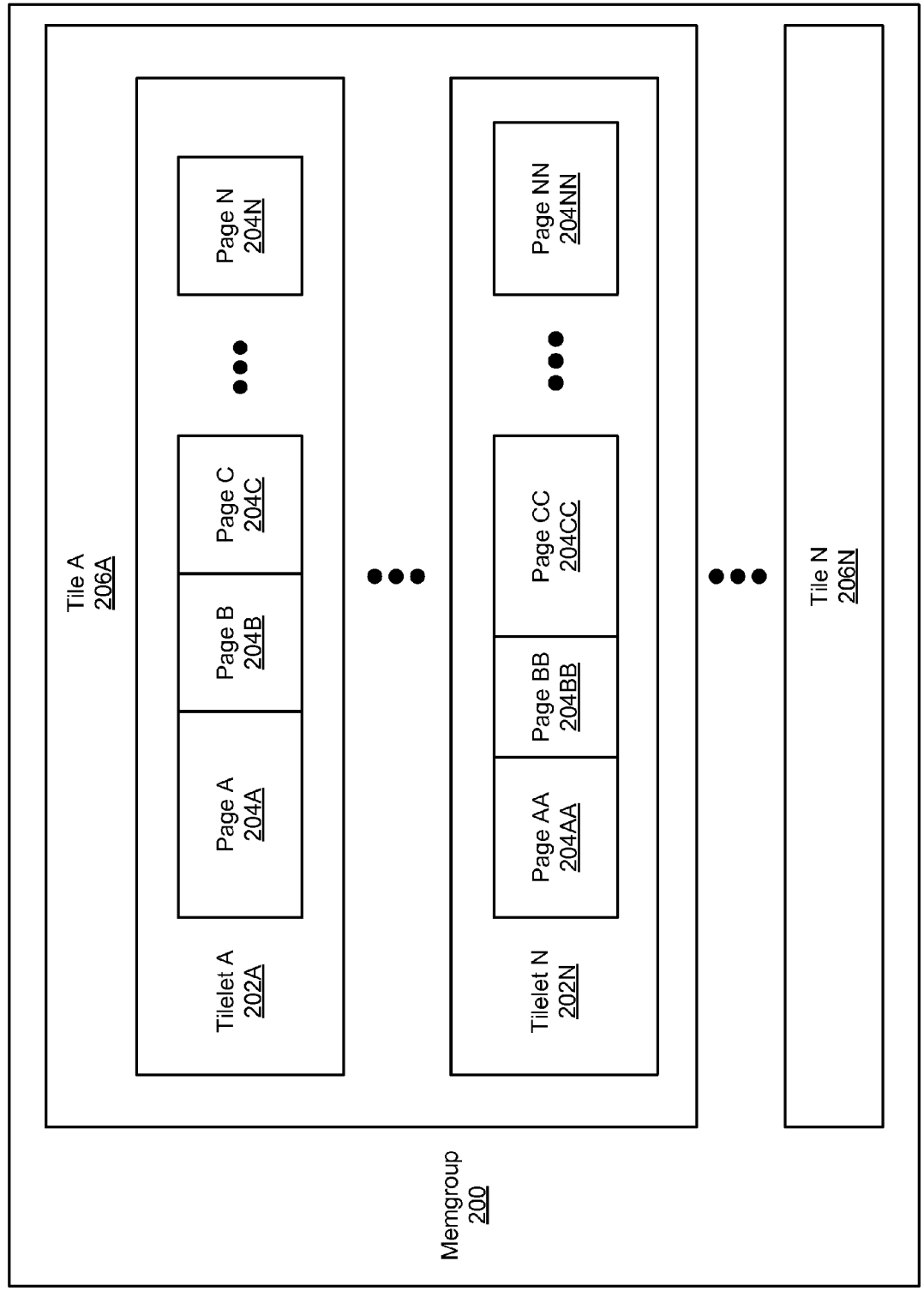
FIG. 2 shows a system in accordance with one or more embodiments of the invention.

FIG. 2 shows a diagram of a memgroup in accordance with one or more embodiments of the invention. As shown in FIG. 2, the memgroup (200) includes multiple tiles (e.g., tile A (206A) and tile N (206N)). Each tile (e.g., tile A (206A) and tile N (206N)) includes multiple tilelets (e.g., tilelet A (202A) and tilelet N (202N)). Each tilelet (e.g., tilelet A (202A) and tilelet N (202N)) includes multiple physical memory pages. As shown in FIG. 2, tilelet A (202A) includes page A (204A), page B (204B), page C (204C), and page N (204N). Tilelet N (202N) includes page AA (204AA), page BB (204BB), page CC (204CC), and page NN (204NN).

In one or more embodiments of the invention, a tilelet (e.g., tilelet A (202A) and tilelet N (202N)) is a contiguous region of memory within a memgroup (e.g., memgroup (200)). Each tilelet (e.g., tilelet A (202A) and tilelet N (202N)) is divided into physical pages (e.g. page A (204A), page B (204B), page C (204C), page N (204N), page AA (204AA), page BB (204BB), page CC (204CC), and page NN (204NN)) for allocation by the allocation subsystem within the VMM. Physical pages (e.g. page A (204A), page B (204B), page C (204C), page N (204N), page AA (204AA), page BB (204BB), page CC (204CC), and page NN (204NN)) on a single tilelet (e.g., tilelet A (202A) or tilelet N (202N)) may vary in size (e.g., 4 kilobytes (kB), 8 kB, 16 kB, etc). In one embodiment of the invention, the page size of a physical page may be referred to as the subtype of the physical page (also referred to as a page subtype). In one embodiment of the invention, a physical page (e.g. page A (204A), page B (204B), page C (204C), page N (204N), page AA (204AA), page BB (204BB), page CC (204CC), and page NN (204NN)) may be greater than the size of a tilelet (e.g., tilelet A (202A) and tilelet N (202N)). In such scenarios, a group of tilelets (e.g., tilelet A (202A) and tilelet N (202N)) may be organized into a single physical page.

In one or more embodiments of the invention, a page subtype may include other page metrics, either in addition to or instead of page size. Examples of other page subtypes include location, access speed, and reliability of the memory.

In one or more embodiments of the invention, pages no longer in use by a thread or by the VMM are freed physical pages. A freed physical page is a physical page that is no longer in use by any other part of the system, and may be reallocated to another thread or process requesting a physical page. In one or more embodiments of the invention, each freed physical page on the system (e.g. page A (204A), page B (204B), page C (204C), page N (204N), page AA (204AA), page BB (204BB), page CC (204CC), and page NN (204NN)) has a corresponding page data structure describing the size and location (e.g., node) of the page stored in the freelist. Page data structures may be organized into tile freelists. Tile freelists may be organized into memgroup freelists (see FIG. 3).

Figure 3:
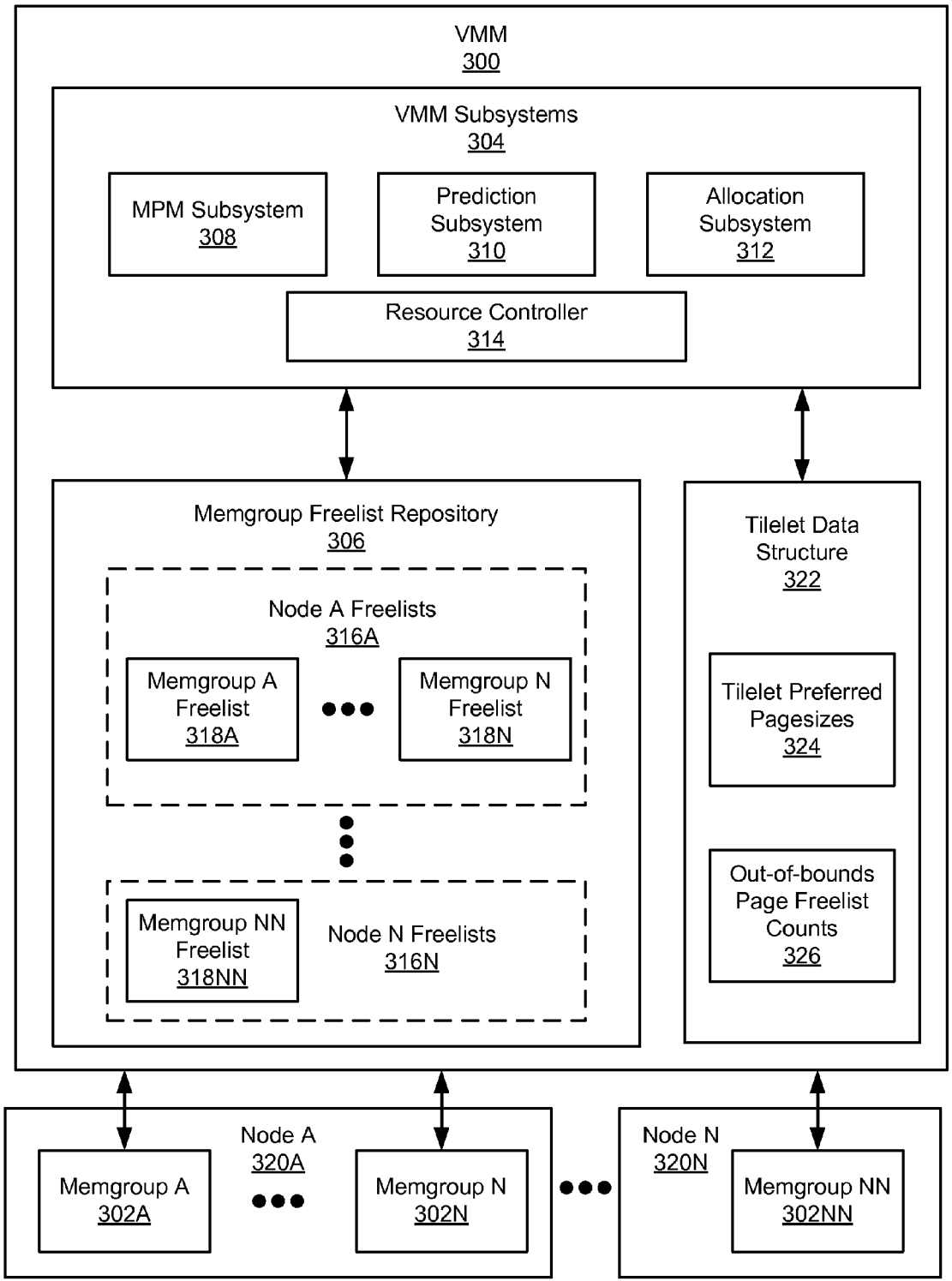
FIG. 3 shows a system in accordance with one or more embodiments of the invention.

FIG. 3 shows a diagram of a virtual memory manager (VMM) in accordance with one or more embodiments of the invention. As shown in FIG. 3, the VMM (300) is operatively connected to multiple memgroups (e.g., memgroup A (302A), memgroup N (302N), memgroup NN (302NN)). The VMM (300) includes VMM subsystems (304), a memgroup freelist repository (306), and a tilelet data structure (322). The VMM subsystems (304) include the memory power management (MPM) subsystem (308), the prediction subsystem (310), the allocation subsystem (312), and the resource controller (314). The memgroup freelist repository (306) includes a plurality of memgroup freelists (e.g., memgroup A freelist (318A), memgroup N freelist (318N), memgroup NN freelist (318NN)). The tilelet data structure (322) includes preferred tilelet pagesizes and out-of-bounds page freelist counts. Each memgroup freelist (e.g., memgroup A freelist (318A), memgroup N freelist (318N), memgroup NN freelist (318NN)) is associated with a node (e.g., node A (320A), node N (320N)).

In one or more embodiments of the invention, the memgroup freelist repository (306) stores lists of page data structures corresponding to freed physical pages of memory. The memgroup freelist repository (306) may be implemented as a set of list data structures in which a list is selected by node and page size. As shown in FIG. 3, page data structures on the memgroup A freelist (318A) and the memgroup N freelist (318N) correspond to memory pages located on node A (320A). Therefore, the memgroup A freelist (318A) and the memgroup N freelist (318N) are referred to as part of the node A freelists (316A). Similarly, page data structures on the memgroup NN freelist (318NN) correspond to memory pages located on node N (320N). Therefore, the memgroup NN freelist (318NN) is referred to as part of the node N freelists (316N).

In one or more embodiments of the invention, the MPM subsystem (308) is a program or group of programs that manage memory power. Specifically, the MPM subsystem (308) activates or deactivates memgroups according to a power management policy. In one or more embodiments of the invention, the prediction subsystem (310) is a program or group of programs that determine the current and expected memory needs of the system.

In one or more embodiments of the invention, the allocation subsystem (312) is a program or group of programs that responds to requests from the prediction subsystem (310) to adjust the subtype (e.g., page size) of freed physical pages on the system. Specifically, the allocation subsystem includes functionality to assign or reassign a preferred page size for a tilelet. Further information about the functionality of the allocation subsystem (312) is provided in FIGS. 5-8.

In one or more embodiments of the invention, the resource controller (314) is a program or group of programs that interacts with the MPM subsystem (308) to measure the demand for memory on the system. The resource controller may also include functionality to determine whether to power down a memgroup based on the system topology and the utilization of the memgroup.

In one or more embodiments of the invention, the VMM subsystems maintain a tilelet data structure (322) that includes preferred tilelet pagesizes (324) and out-of-bounds page freelist counts (326). Specifically, the tilelet data structure (322) may include a number of tilelet data structure entries corresponding to tilelets in the memgroups (e.g., memgroup A (302A), memgroup N (302N), memgroup NN (302NN)). Each tilelet data structure entry may include a tilelet preferred pagesize (e.g., stored in the preferred tilelet pagesizes (324)) and an out-of-bounds page freelist count (e.g., stored in the out-of-bounds page freelist counts (326)). The tilelet preferred pagesize specifies a physical page subtype (e.g., size) preference set by the allocation subsystem in response to a request by the prediction subsystem. In one or more embodiments of the invention, a system, or node on a system, may have a shortage or deficiency of pages of a certain subtype. In such cases, the tilelet preferred pagesize may be assigned to the deficient subtype. When freed physical pages on a system are coalesced, the tilelet preferred pagesize dictates the size (or other subtype) into which the pages are coalesced (or coalesced and subdivided).

In one or more embodiments of the invention, the out-of-bounds page freelist counts (326) stores an out-of-bounds page freelist count (not shown) for each tilelet on the system. Each out-of-bounds page freelist count indicates the amount of memory in the out-of-bounds page freelist for the associated tilelet. For each tilelet in each memgroup, the out-of-bounds freelist count tracks the total amount of current freed memory for all freed pages on the tilelet. The freed memory may be represented in terms of bytes of memory available (e.g., an out-of-bounds freelist count for a tilelet may be recorded as 256 kB of memory). Alternatively, in one embodiment of the invention, the amount of memory freed on each tilelet is tracked in terms of base pages. For example, if a system implements a base page of 4 kB, a 4 kB freed page on a tilelet will be reflected in the out-of-bounds page freelist count as 1. On the same system, a 4 megabyte freed page on a tilelet will be reflected in the out-of-bounds page freelist count as 1024. Accordingly, in the current example, a tilelet that includes one 4 kB page of freed memory and one 4 megabyte page of freed memory will have an out-of-bounds page freelist count of 1025.

Figure 4:
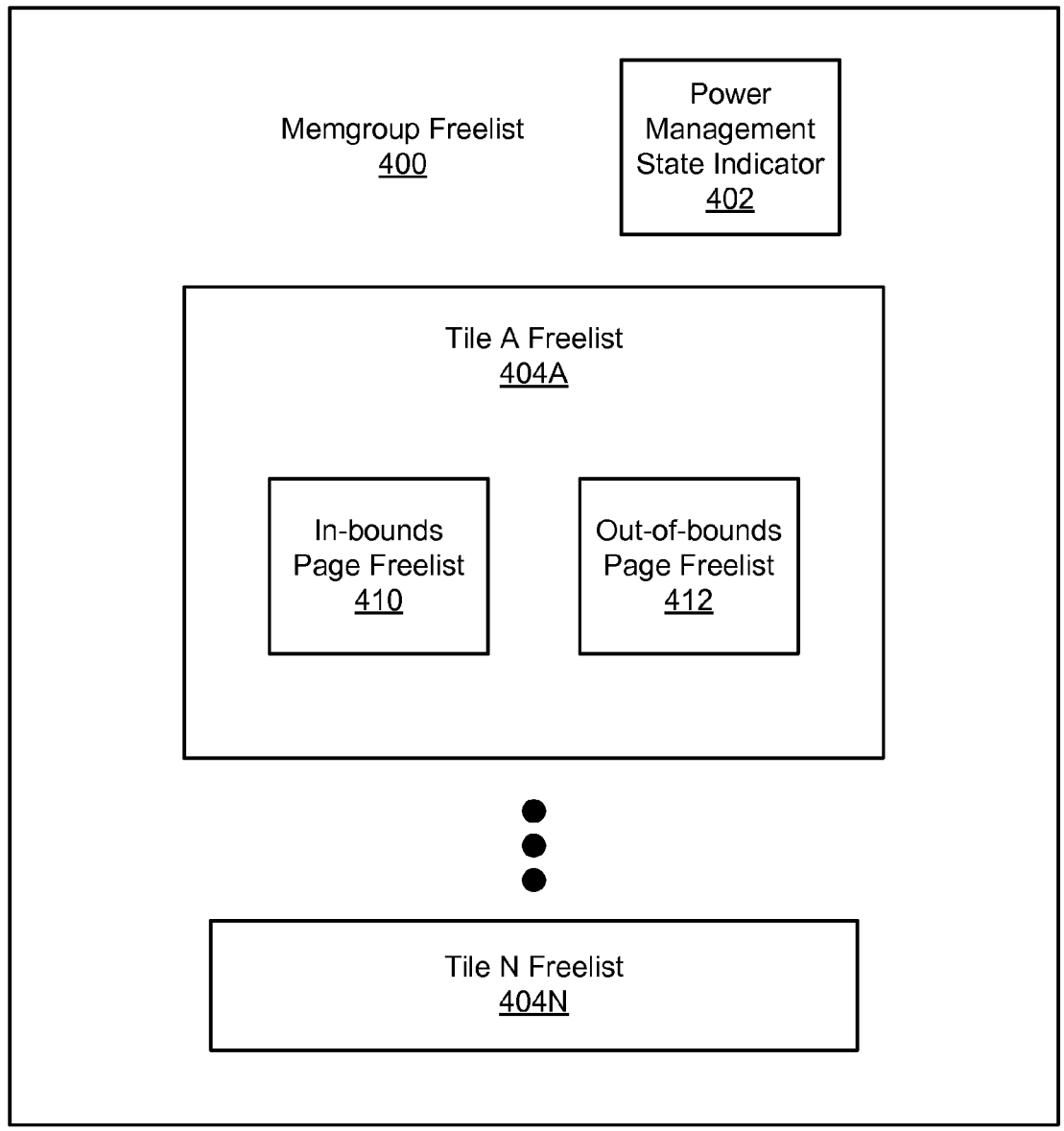
FIG. 4 shows a system in accordance with one or more embodiments of the invention.

FIG. 4 shows a memgroup freelist in accordance with one or more embodiments of the invention. As shown in FIG. 4, memgroup freelist (400) includes a power management state (402), and multiple tile freelists (e.g., tile A freelist (404A), tile N freelist (404N)). Each tile freelist (e.g., tile A freelist (404A), tile N freelist (404N)) includes an in-bounds page freelist (410), and an out-of-bounds page freelist (412). In one embodiment of the invention, the in-bounds page freelist (410) and the out-of-bounds page freelist (412) may each be implemented as a collection of lists.

In one or more embodiments of the invention, the in-bounds page freelist (410) is a list of freed physical pages that conform to the tilelet preferred pagesize. Specifically, the pages referenced in the in-bounds page freelist (410) are pages of a size that matches the value for the tilelet preferred page size in the preferred tilelet pagesizes (preferred tilelet pagesizes (324) in FIG. 3). In one or more embodiments of the invention, the out-of-bounds page freelist (412) is a list of physical pages that do not conform to the tilelet preferred pagesize. Specifically, the pages referenced in the out-of-bounds page freelist (412) are pages of a size that does not match the value for the preferred page size of their corresponding tilelets, as described in the preferred tilelet pagesizes (preferred tilelet pagesizes (324) in FIG. 3).

In one or more embodiments of the invention, the power management state (402) indicates whether memory from the memgroup associated with the memgroup freelist (400) should be allocated to requesting processes and threads. Specifically, the power management state (402) may be used by the MPM subsystem to indicate that physical pages from a memgroup should not be allocated in preparation for powering down of the memgroup.

Figure 5:
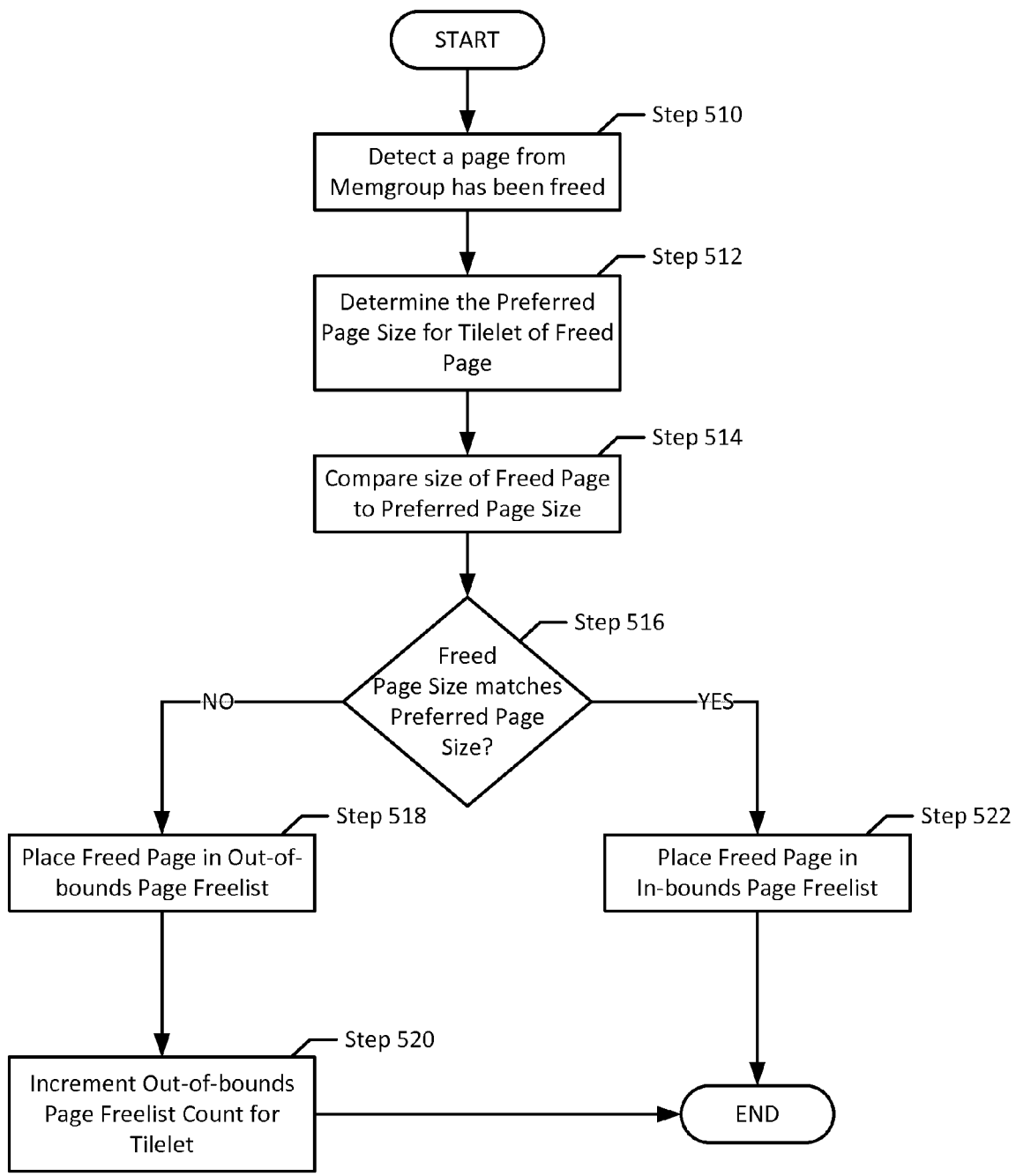
FIG. 5 shows a flow diagram in accordance with one or more embodiments of the invention.

FIG. 5 shows a flowchart for adding a freed page to a tile page freelist in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

At Step 510, the allocation subsystem detects that a page from a memgroup has been freed. At Step 512, the allocation subsystem obtains the preferred pagesize for the tilelet associated with the freed physical page. In one embodiment of the invention, the allocation subsystem queries the tilelet data structure to obtain the tilelet preferred pagesize. At Step 514, the allocation subsystem compares the size of the freed physical page to the tilelet preferred pagesize.

At Step 516, the allocation subsystem determines whether the freed physical page size matches the tilelet preferred pagesize for the tilelet. If at Step 516, the allocation subsystem determines that the freed physical page size does not match the tilelet preferred pagesize for the tilelet, then at Step 518, the allocation subsystem places the freed page in the out-of-bounds page freelist in the tile freelist. At Step 520, the allocation subsystem increments the out-of-bounds page freelist count in the tilelet data structure by the size of the page. In one or more embodiments of the invention, a page may be placed in the out-of-bounds page freelist of a tile freelist if the tilelet has not been assigned a tilelet preferred pagesize.

If at Step 516 the allocation subsystem determines that the freed physical page size matches the tilelet preferred pagesize for the tilelet, then at Step 522, the freed physical page is placed in the in-bounds page freelist for the tile.

Figure 6:
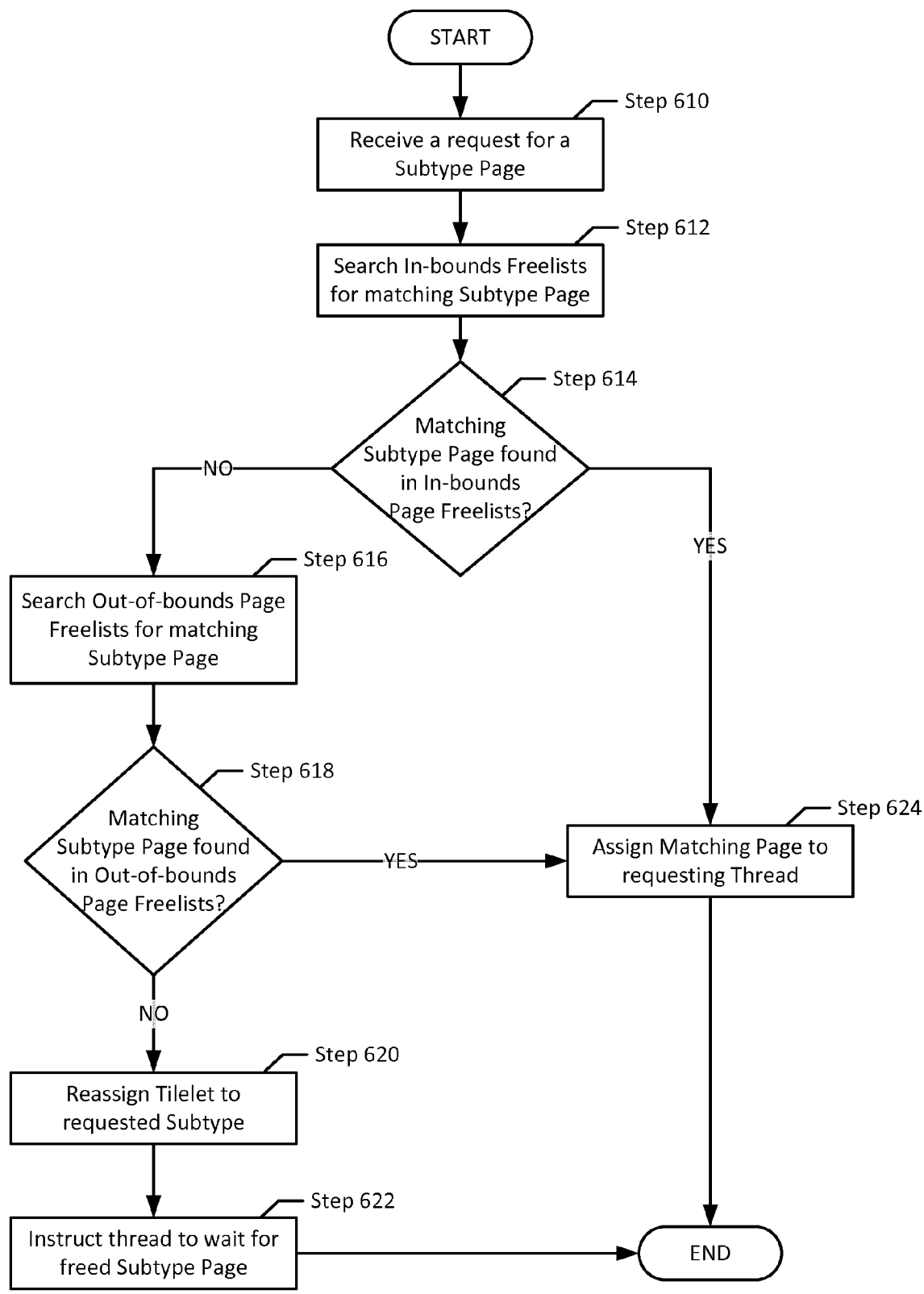
FIG. 6 shows a flow diagram in accordance with one or more embodiments of the invention.

FIG. 6 shows a flowchart for providing a freed page to a requesting thread in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

At Step 610, the allocation subsystem receives a request for a physical page matching a specified subtype, such as size. At Step 612, the allocation subsystem searches the in-bounds page freelists of each memgroup freelist to determine whether a freed page of the specified subtype is available. In one embodiment of the invention, the allocation subsystem searches only freelists for memgroups associated with the node executing the requesting process. Further, in one embodiment of the invention, the allocation subsystem may search memgroup freelists in nearby nodes (i.e., nodes with a low latency of communication with the source node). In one embodiment of the invention, the request may limit the matching subtype pages to those physical pages on a specified node, set of nodes, or nodes within a specified latency range from the source node.

At Step 614, the allocation subsystem determines whether a matching subtype page has been found in the in-bounds page freelists subject to the search. If at Step 614 the allocation subsystem determines that no matching subtype page has been found, then at Step 616, the allocation subsystem searches the out-of-bounds page freelists of various memgroup freelists for a matching subtype page (similar to the search performed in Step 612 with regard to the in-bounds freelists). At Step 618, the allocation subsystem determines whether a matching subtype page has been found in the out-of-bounds page freelists subject to the search.

If at Step 618, the allocation subsystem determines that no matching subtype page has been found in the out-of-bounds page freelists, then at Step 620, the allocation subsystem reassigns the tilelet preferred pagesize of a tilelet to the requested subtype. In one embodiment of the invention, a tilelet to reassign is selected based on the out-of-bounds page freelist count of the tilelet stored in the tilelet data structure. For example, a tilelet with a relatively high out-of-bounds page freelist count may be selected for reassignment over a tilelet with a relatively low out-of-bounds page freelist count. Further detail regarding Step 620 is provided in FIG. 7. At Step 622, the requesting process is instructed to wait until a page matching the requested subtype is freed. In one embodiment of the invention, the requesting process is instructed indirectly by another subsystem within the VMM. In one embodiment of the invention, Step 620 and Step 622 are induced by the prediction subsystem prior to receiving the request in Step 610, in response to information that the system will require more pages of the requested subtype.

If at Step 614, the allocation subsystem determines that at least one matching subtype page has been found in the in-bounds page freelists, or if at Step 618, the allocation subsystem determines that at least one matching subtype page has been found in the out-of-bounds page freelists, then at Step 624, the address of the matching physical page is provided to the VMM for population by the requesting process's virtual page. If the matching page is assigned from the out-of-bounds page freelist in Step 618, then the out-of-bounds page freelist count is decremented by the size of the assigned page.

Those skilled in the art will appreciate that because in-bounds page freelist are searched first, pages stored in the out-of-bounds page freelists will remain free for longer periods of time. Therefore, the amount of page data structures in the out-of-bounds page freelist may grow faster than the amount of page data structures in the in-bounds page freelist. Therefore, the physical pages corresponding to the page data structures in the out-of-bounds page freelists may be more easily coalesced into larger pages, providing the system with more flexibility to create pages of a required size.

Figure 7:
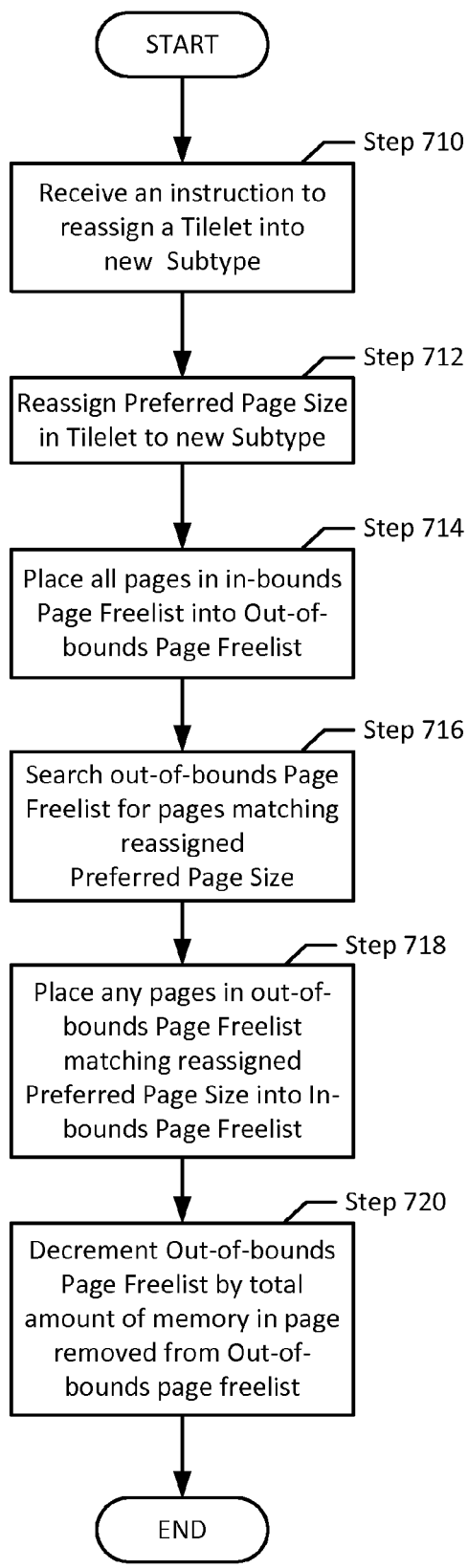
FIG. 7 shows a flow diagram in accordance with one or more embodiments of the invention.

FIG. 7 shows a flowchart for reassigning a tilelet preferred pagesize of a tilelet preferred pagesize in a tilelet data structure in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

At Step 710, the allocation subsystem receives an instruction to reassign a specified tilelet to a specified subtype. At Step 712, the allocation subsystem alters the value of the tilelet preferred pagesize to the new subtype. At Step 714, the allocation subsystem accesses the tile freelist for the tilelet and places all pages from that tilelet stored in the in-bounds page freelist into the out-of-bounds page freelist because they no longer match the newly assigned tilelet preferred pagesize. Also at Step 714, the out-of-bounds page freelist count is incremented by the size of the pages added to the out-of-bounds page freelist. At Step 716, the out-of-bounds page freelist is searched for any freed pages that match the updated subtype of the tilelet preferred pagesize. At Step 718, all physical pages in the out-of-bounds page freelist that match the updated subtype of the tilelet preferred pagesize are relocated to the in-bounds page freelist. At Step 720, the out-of-bounds page freelist count is decremented accordingly.

Figure 8:
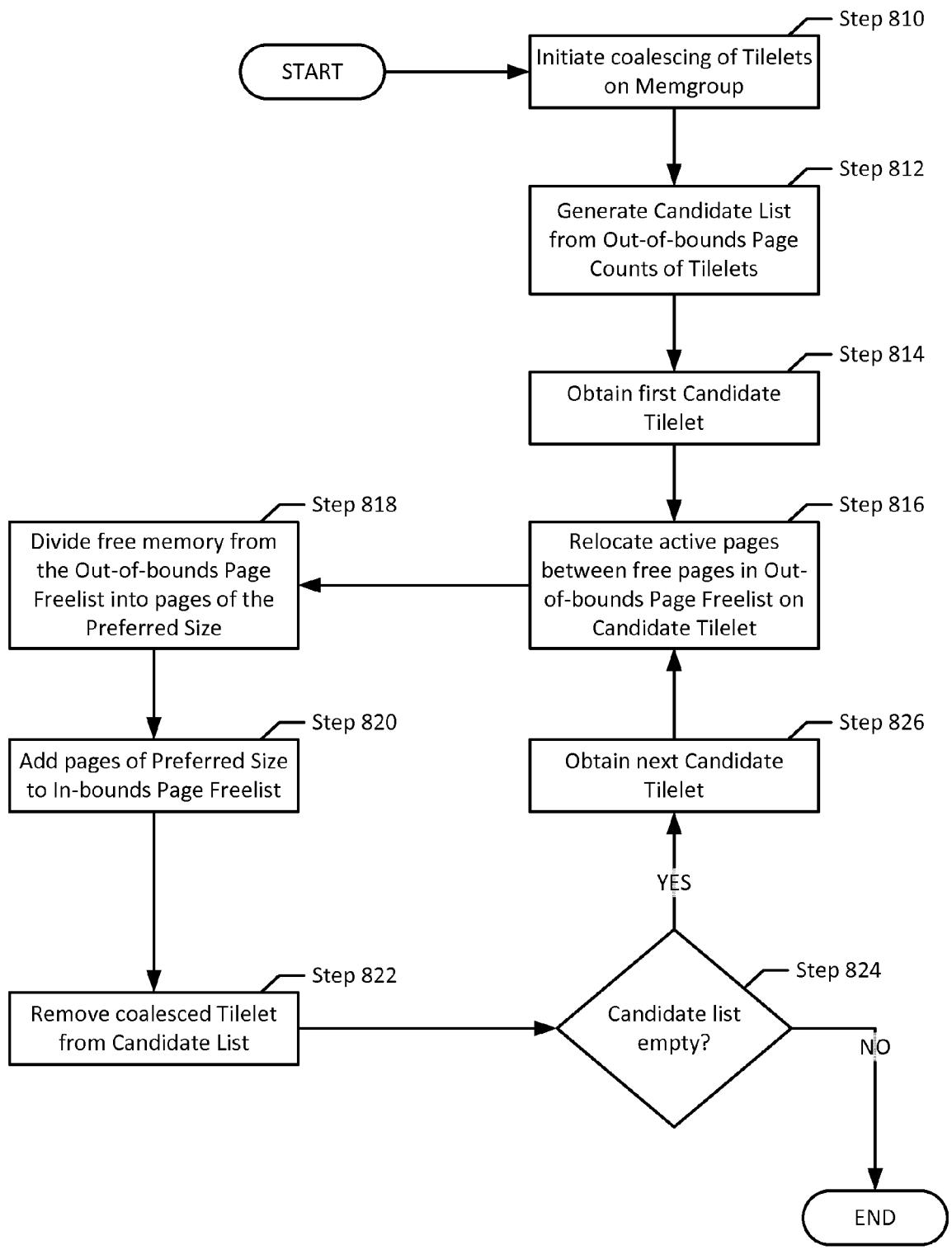
FIG. 8 shows a flow diagram in accordance with one or more embodiments of the invention.

FIG. 8 shows a flowchart for coalescing freed memory into a specified subtype in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

At Step 810, tilelet coalescing is initiated on a memgroup. In one embodiment of the invention, initializing the tilelet coalescing occurs periodically on each memgroup. In one embodiment of the invention, the allocation subsystem includes a process that continuously and sequentially initiates tilelet coalescing on each memgroup. In one embodiment of the invention, multiple tilelets may be coalesced in parallel.

At Step 812, the allocation subsystem generates a candidate list of tilelets using the out-of-bounds page freelist count of each tilelet in the memgroup. In one embodiment of the invention, a candidate list is a list of tilelets that satisfy criteria suggesting the tilelets should be coalesced. Such criteria may include, but is not limited to, the total amount of free pages on a tilelet and amount of freed memory on the tilelet as indicated by the out-of-bounds page freelist count for the tilelet. In one embodiment of the invention, a candidate list is generated with a portion of the tilelets in a memgroup having the highest relative out-of-bounds freed memory in the memgroup. In one embodiment of the invention, the candidate list is generated with the tilelets having the most freed memory relative to other tilelets in the memgroup. In one embodiment of the invention, the candidate list is generated using a combination of different metrics (e.g., ratio of page data structures to amount of free memory on the tilelet).

In one or more embodiments of the invention, coalescing freed pages on a tilelet may involve relocating active pages on the tilelet. Accordingly, tilelets may be selected for the candidate list based, at least partially, on the ability of the system to generate as many pages matching the tilelet preferred pagesize with minimal performance impact caused by relocating active pages.

At Step 814, the allocation subsystem obtains the first tilelet from the candidate list. At Step 816, the allocation subsystem relocates any active physical pages between freed pages that interrupt a contiguous group of memory that is to be coalesced. In one embodiment of the invention, the active (i.e., not freed) physical pages may be reassigned to a different tilelet (e.g., a tilelet with a tilelet preferred pagesize matching the subtype of the active physical page). In one embodiment of the invention, active pages which do not bisect otherwise contiguous regions of freed memory are not relocated.

At Step 818, the physical pages making up contiguous regions of freed memory are divided into physical pages of a size matching the tilelet preferred pagesize of the tilelet. In one embodiment of the invention, active pages may remain on the tilelet, regardless of the size of the active pages. At Step 820, the created physical pages are added to the in-bounds page freelist of the tilelet. At Step 822, the tilelet is removed from the candidate list.

If at Step 824, the allocation subsystem determines that the candidate list is not empty, then at Step 826, the next candidate tilelet is obtained, and the process continues to Step 816. If at Step 824, the allocation subsystem determines that the candidate list is empty, then the process ends.

FIGS. 9A-9G show an example in accordance with one or more embodiments of the invention. Specifically, FIGS. 9B-9G show an example system at various points during the example timeline depicted in FIG. 9A. For the purposes of the example, assume that the page data structures depicted in FIGS. 9B, 9C, 9F, and 9H reference pages on the same tilelet, and that the tilelet is associated with the tilelet preferred pagesize (902) and the out-of-bounds page freelist count (904) depicted in the tilelet data structure (922). Although for the purposes of the example, the tile freelist (900) depicted in FIGS. 9B, 9C, 9F, and 9H includes page data structures for a single tilelet, those skilled in the art will appreciate that a tile freelist may include page data structures from more than one or all tilelets in the associated tile. Further, although the tilelet data structure (922) depicted in FIGS. 9B, 9C, 9F, and 9H, shows only a single tilelet preferred pagesize (902) and out-of-bounds page freelist count (904), those skilled in the art will appreciate that a tilelet data structure may include a tilelet preferred pagesize and an out-of-bounds page freelist count for more than one tilelet, or all tilelets, on the system.

Figure 9A:
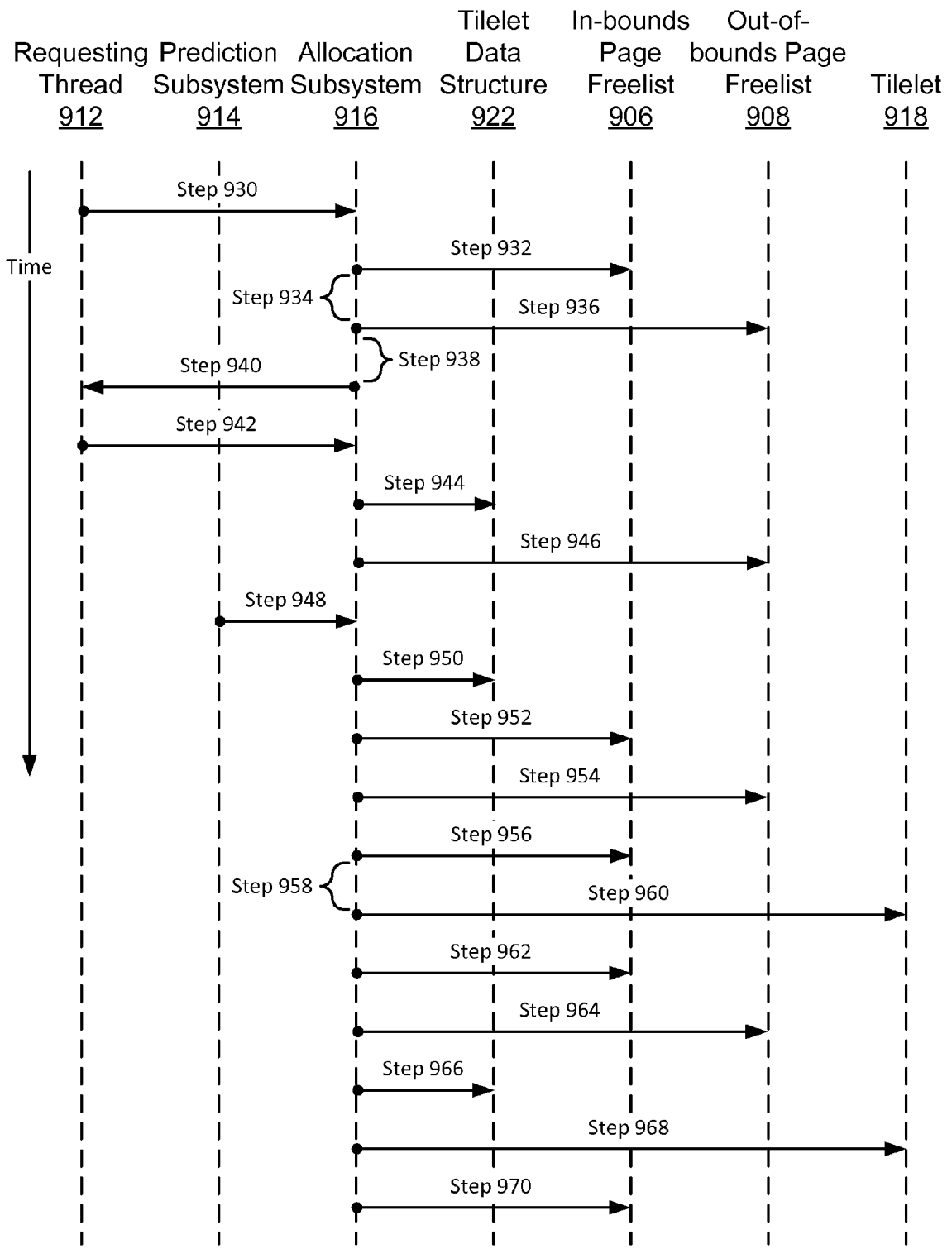
FIGS. 9A-9H show an example in accordance with one or more embodiments of the invention.
Figure 9B:
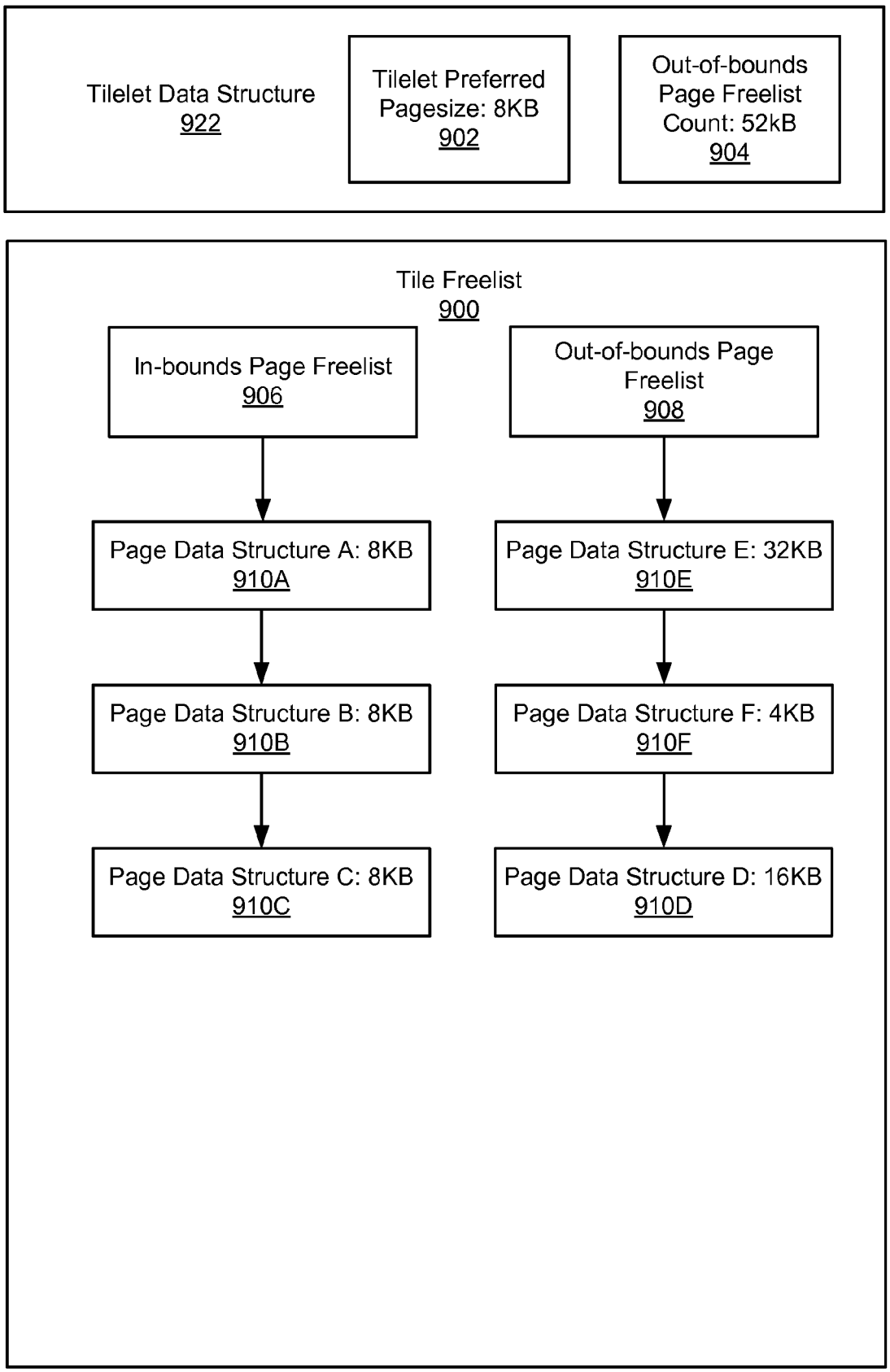

Step 930 through Step 940 describe the process undertaken by the allocation subsystem in providing a page data structure to a requesting thread, as described in FIG. 6. At Step 930, the allocation subsystem (916) receives a request for a physical page with a subtype page size of 16 kB from a requesting thread (912). At Step 932, the allocation subsystem searches the in-bounds page freelists of each memgroup and tile (including tile freelist (900)) to determine whether a freed page of the subtype 16 kB is available. As depicted in FIG. 9B, the tilelet data structure (922) indicates that the tilelet preferred pagesize (902) for tilelet is 8 kB and the out-of-bounds page freelist count (904) is 3. Also as depicted in FIG. 9B, the in-bounds page freelist (906) in the tile freelist includes page data structure A (910A) with subtype 8 kB, page data structure B (910B) with subtype 8 kB, and page data structure C (910C) with subtype 8 kB. No physical page with a subtype of 16 kB is available in the in-bounds page freelist (906).

At Step 934, the allocation subsystem (916) determines that no matching subtype page has been found in the in-bounds page freelists (including in-bounds page freelist (906)). At Step 936, the allocation subsystem (916) searches the out-of-bounds page freelists (including out-of-bounds page freelist (908)) for a physical page with a subtype matching 16 kB. As depicted in FIG. 9B, for tile freelist (900), the out-of-bounds page freelist (908) includes page data structure E (910E) with subtype 32 kB, page data structure F (910F) with subtype 4 kB, and page data structure D (910D) with subtype 16 kB. At Step 938, the allocation subsystem (916) determines that page data structure D (910D) matches the requested subtype. At Step 940, the allocation subsystem (916) provides page data structure D (910D) to the requesting thread (912), and decrements the out-of-bounds freed page count (904) by 16 kB (the size of page D (920D) as stored in page data structure D (910D)).

Step 942 through Step 946 describe the process undertaken by the allocation subsystem in storing a freed page data structure in the memgroup freelist, as described in FIG. 5. At Step 942, the allocation subsystem (916) is notified that the requesting thread (912) has freed page data structure D (910D). As depicted in FIG. 9B, the tilelet preferred pagesize (902) stored in the tilelet data structure (922) is 8 kB. At Step 944, the allocation subsystem (916) determines that the subtype of the freed page (16 kB) does not match the tilelet preferred pagesize (902) of the associated tilelet. At Step 946, the allocation subsystem stores the page data structure corresponding to page data structure D (910D) in the out-of-bounds page freelist (908) of the tile freelist (900), and increments the out-of-bounds freed page count (904) by 16 kB (the size of page D (920D) as stored in page data structure D (910D)).

Steps 948 through Step 954 describe the process undertaken by the allocation subsystem in reassigning a tilelet preferred pagesize of a tilelet, as described in FIG. 7. At Step 948, the allocation subsystem (916) receives a request to reassign the tilelet preferred pagesize (902) of the tilelet (stored in the tilelet data structure (922)) to the subtype 16 kB. In one embodiment of the invention, the request is received from the prediction subsystem in response to a determination that the system has a deficiency of a certain subtype of physical page.

At Step 950, the allocation subsystem (916) alters the value of the tilelet preferred pagesize (902) from 8 kB to 16 kB. At Step 952, the allocation subsystem moves all freelist data structures in the in-bounds page freelist (906), which includes page data structure A (910A), page data structure B (910B), and page data structure C (910C) to the out-of-bounds page freelist (908). Also at Step 952, the out-of-bounds page freelist count (904) in the tilelet data structure (922) is updated to reflect the amount of memory within the tilelet and in the out-of-bounds page freelist. At Step 954, the allocation subsystem (916) searches the out-of-bounds page freelist (908) to determine whether any of the page freelist data structures matches the reassigned subtype value of the preferred pagesize (902) of 16 kB. At Step 956, the allocation subsystem (916) determines that page data structure D (910D) matches the reassigned subtype of 16 kB, and moves the page freelist data structure corresponding to page data structure D (910D) to the in-bounds page freelist (906). Also at Step 956, the out-of-bounds page freelist count (904) in the page data structure (922) is updated to reflect the remaining amount of memory within the tilelet and in the out-of-bounds page freelist.

Figure 9C:
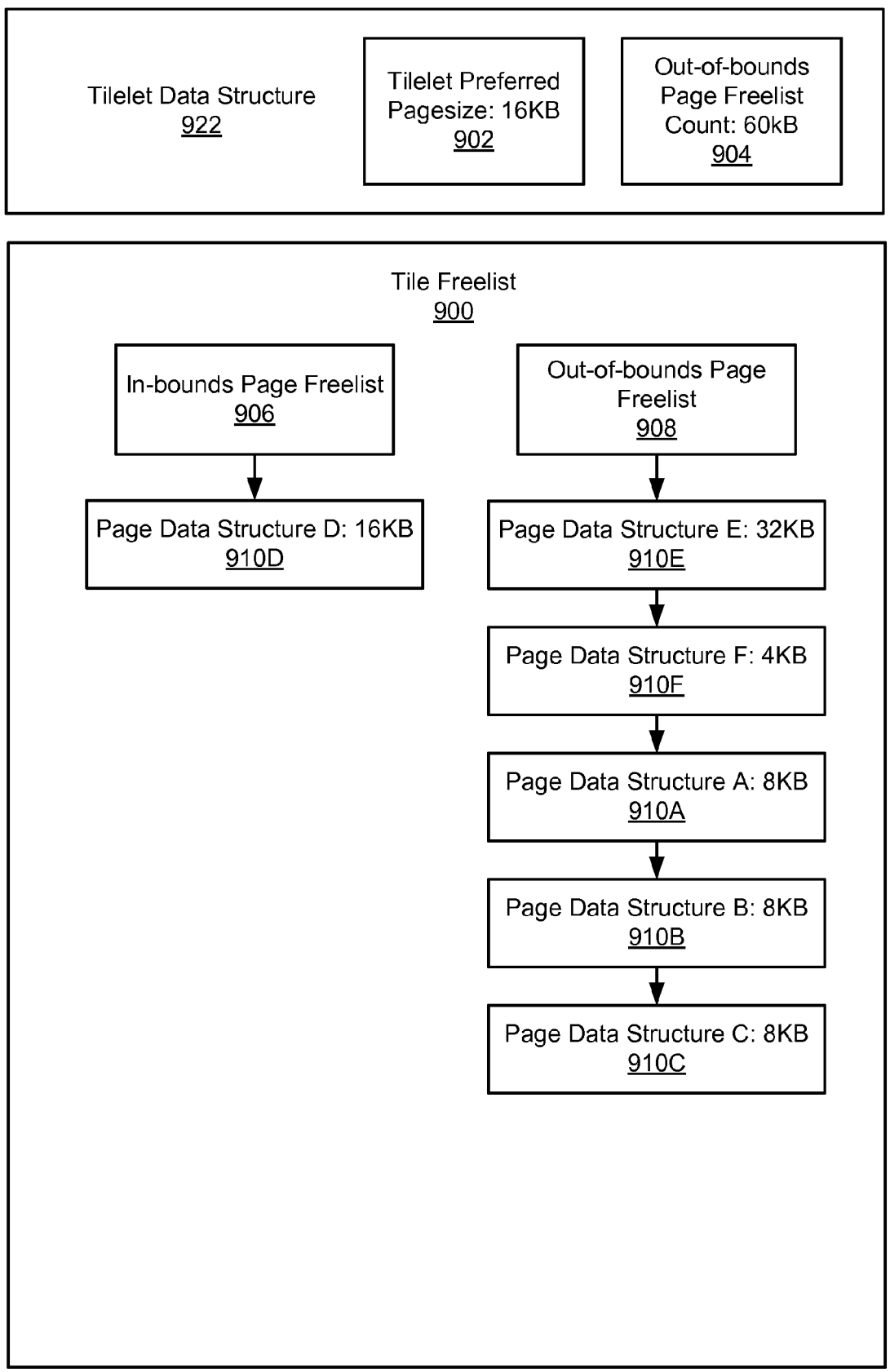

FIG. 9C shows the tilelet data structure (922) and tile freelist (900) after the allocation subsystem (916) has carried out the activities described in regard to Step 956. As depicted in FIG. 9C, the preferred pagesize (902) is 16 kB. The in-bounds page freelist (906) includes page data structure D (910D) corresponding to physical page D (920D). The out-of-bounds page freelist (908) includes five page data structures: page data structure E (910E), page data structure F (910F), page data structure A (910A), page data structure B (910B), and page data structure C (910C). The out-of-bounds page freelist count (904) has a value of 60 kB.

Step 958 through Step 970 describe the process undertaken by the allocation subsystem in coalescing pages of a tilelet, as described in FIG. 8. At Step 958, the allocation subsystem (916) initiates a coalescing of the memory on the memgroup encapsulating tile freelist (900), and generates a candidate list. For the purposes of this example, assume that the candidate list is generated from all tilelets in each tile of the memgroup with an out-of-bounds page freelist count of at least 60 kB. Also assume that the tilelet corresponding to the tilelet preferred pagesize (902) and out-of-bounds page freelist count (904) is the only tilelet in the memgroup with an out-of-bounds page freelist count of at least 60 kB.

Figure 9D:
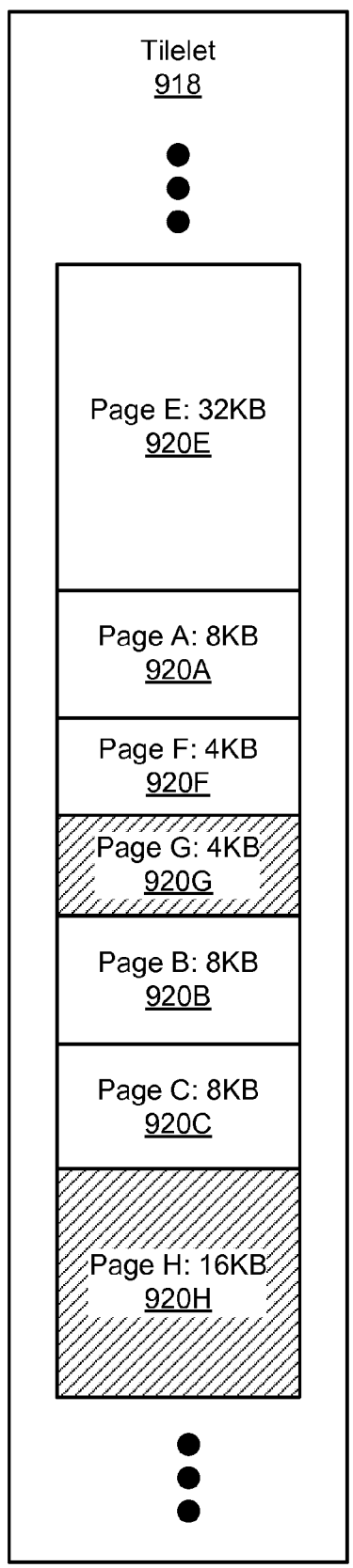

FIG. 9D depicts an 80 kB size portion of the physical memory for a tilelet (918) corresponding to the tilelet data structure (922) and the tile freelist (900). Specifically, FIG. 9D depicts the state of a portion of the tilelet (918) prior to the allocation subsystem (916) coalescing the freed memory on the tilelet (918). As shown in FIG. 9D, the portion of the tilelet begins with page E (920E), a freed page with a size of 32 kB of memory units, corresponding to page data structure E (910E). Page E (920E) is followed by page A (920A), a freed page with a size of 8 kB corresponding to page data structure A (910A), and page F (920F), a freed page with a size of 4 kB corresponding to page data structure F (910F). Following page F (920F) is page G (920G), an active page with a size of 4 kB, and page B (920B), a freed page with a size of 8 kB corresponding to page data structure B (910B). Following page B (920B) is page C (920C), a freed page with a size of 8 kB corresponding to page data structure C (910C), and page H (920H), an active page with a size of 16 kB. Note that, for the purposes of the example, page D (not shown) corresponding to page data structure D (910D) is located elsewhere on the tile freelist (900).

Continuing with the discussion of FIG. 9D, the contiguous region of memory (tilelet (918)) depicted in FIG. 9D is 80 kB in size. The tilelet (918) includes 60 kB of freed memory (page E (920E) (32 kB), page A (920A) (8 kB), page F (920F) (4 kB), page B (920B) (8 kB), and page C (920C) (8 kB)), interrupted by two active regions totaling 20 kB (page H (920H) (16 kB) and page G (920G) (4 kB)).

At Step 960, the tilelet (918) is targeted by the allocation subsystem (916) for coalescing, and the allocation subsystem (916) relocates the active pages between freed pages corresponding to data structures in the out-of-bounds page freelist (908). As depicted in FIG. 9D, page H (920H) and page G (920G) are active pages between freed pages (page E (920E), page A (920A), page F (920F), page B (920B), and page C (920C)). Therefore, at Step 960, page H (920H) and page G (920G) are relocated to other pages on different tilelets. In one embodiment of the invention, the pages may be relocated out of the current memgroup.

Figure 9E:
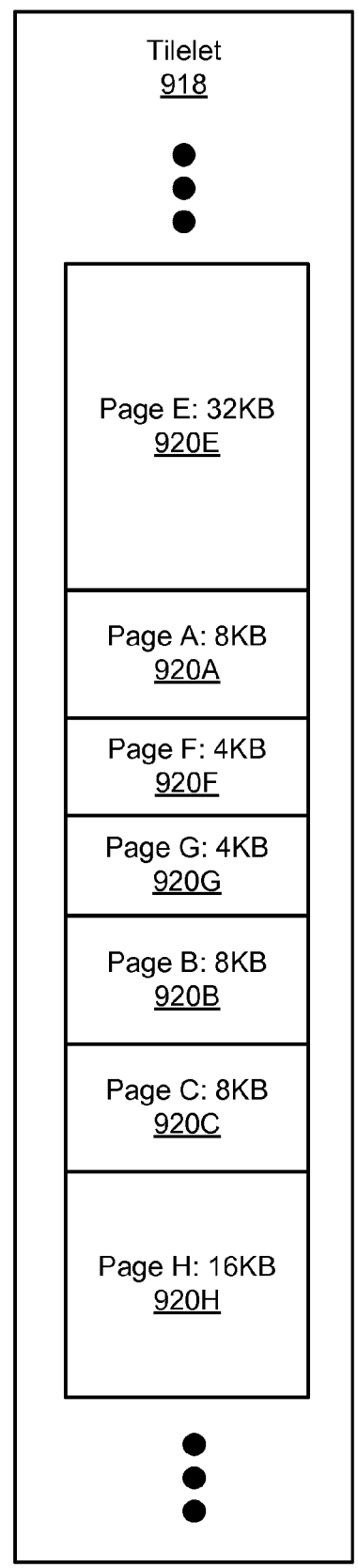

FIG. 9E depicts the tilelet (918) after the content of page H (920H) and page G (920G) has been relocated, and page H (920H) and page G (920G) have been freed. As depicted in FIG. 9E, the tilelet (918) includes a contiguous region of freed memory 80 kB in size made up of page E (920E) (32 kB), page A (920A) (8 kB), page F (920F) (4 kB), page G (920G) (4 kB), page B (920B) (8 kB), page C (920C) (8 kB), and page H (920H) (16 kB).

Returning to FIG. 9A, at Step 962, the pages freed from the relocation are added to the tile freelist (900). Page H matches the tilelet preferred pagesize (902) and therefore, at Step 962, a corresponding page data structure (page data structure H (910H)) is placed in the in-bounds page freelist (906). Page G does not match the tilelet preferred pagesize (902) and therefore, at Step 964, a corresponding page data structure (page data structure G (910G)) is placed in the out-of-bounds page freelist (908). Also at Step 964, the out-of-bounds page freelist count (904) in the tilelet data structure (922) is updated to reflect the increased amount of memory in the out-of-bounds page freelist.

Figure 9F:
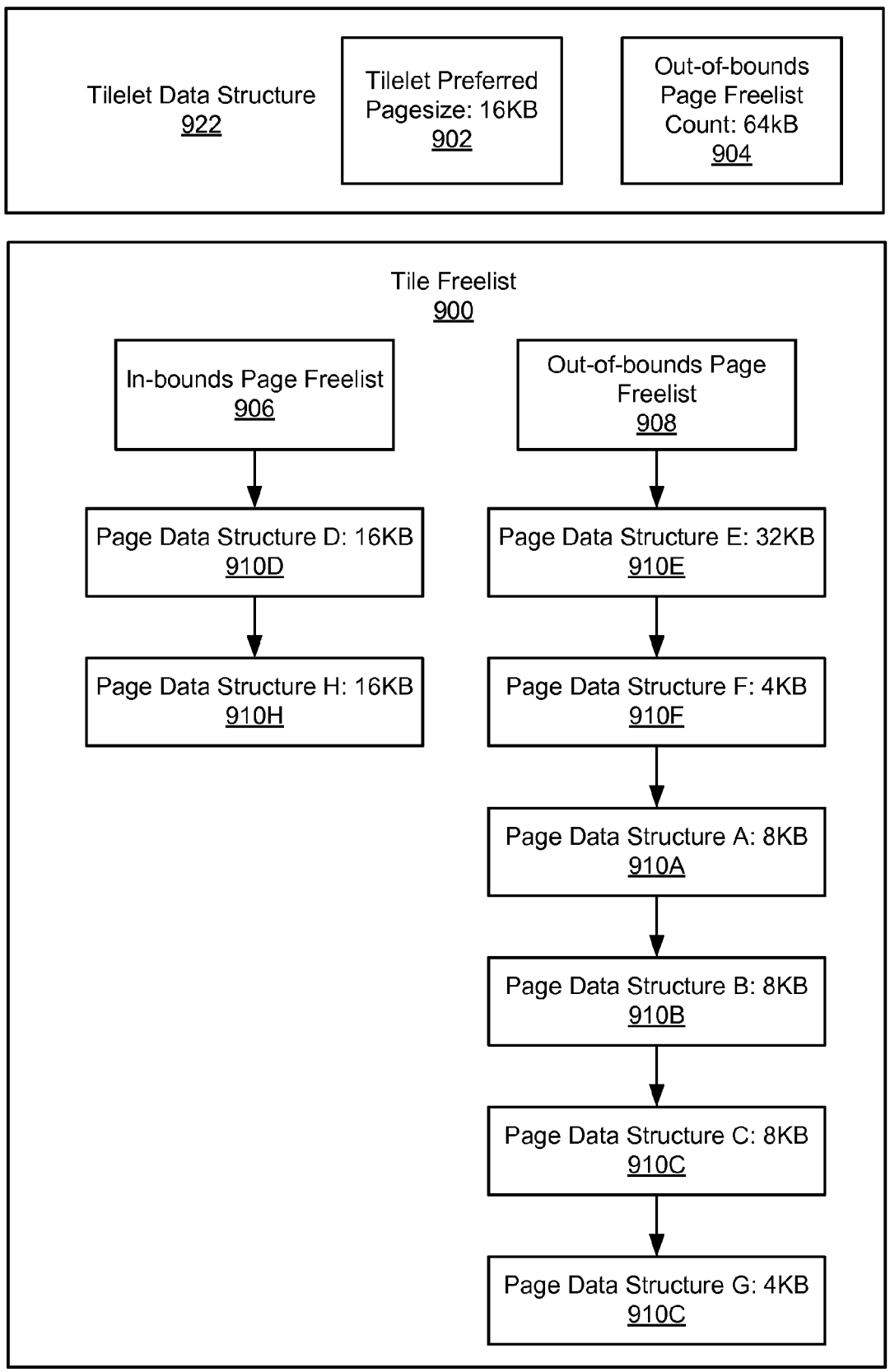

FIG. 9F depicts the tile freelist (900) after Step 964. As shown in FIG. 9F, the in-bounds page freelist (906) includes page data structure D (910D) and page data structure H (910H). The out-of-bounds page freelist (908) includes page data structure E (910E), page data structure F (910F) page data structure A (910A), page data structure B (910B), page data structure C (910C), and page data structure G (910G).

Returning to FIG. 9A, at Step 966, the allocation subsystem (916) coalesces the freed pages on the tilelet (918) by removing the page data structures corresponding to the pages in the portion of the tilelet. At Step 968, the allocation subsystem (916) divides the contiguous region of freed memory into pages of a size matching the tilelet preferred pagesize (902) for the tilelet (918), and generates new page data structures corresponding to created pages.

Figure 9G:
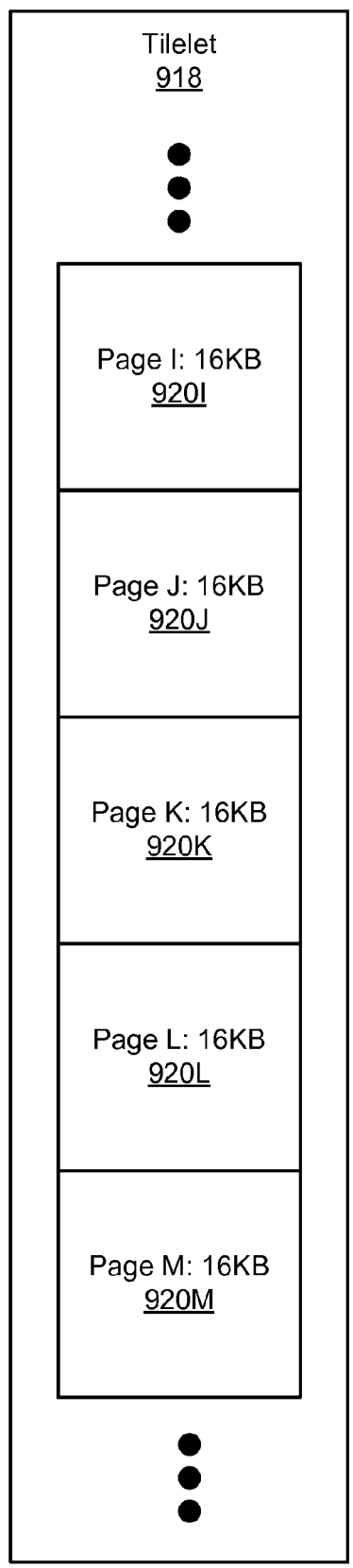

FIG. 9G depicts the tilelet (918) after Step 968. Specifically, FIG. 9G depicts the tilelet after the pages in FIG. 9E

(page E (920E), page A (920A), page F (920F), page H (920H), page B (920B), page G (920G), and page C (920C)) have been coalesced. Because the corresponding page data structures have been removed, the pages on the tile depicted in FIG. 9E (page E (920E), page A (920A), page F (920F), page H (920H), page B (920B), page G (920G), and page C (920C)) no longer exist as pages on the tilelet. As shown in FIG. 9G, the newly generated pages (page I (920I), page J (920J), page K (920K), page L (920L), and page M (920M)) corresponding to the newly created page data structures now occupy the same 80 kB portion of memory on the tilelet. Although for the purposes of the example, five new pages of uniform size were generated from the pages corresponding to the page data structures in the out-of-bounds page freelist, in one embodiment of the invention, as many pages of the tilelet preferred pagesize are created as is possible, and the remaining memory is used to generate page data structures with different sizes (which would then be placed in the out-of-bounds page freelist).

Figure 9H:
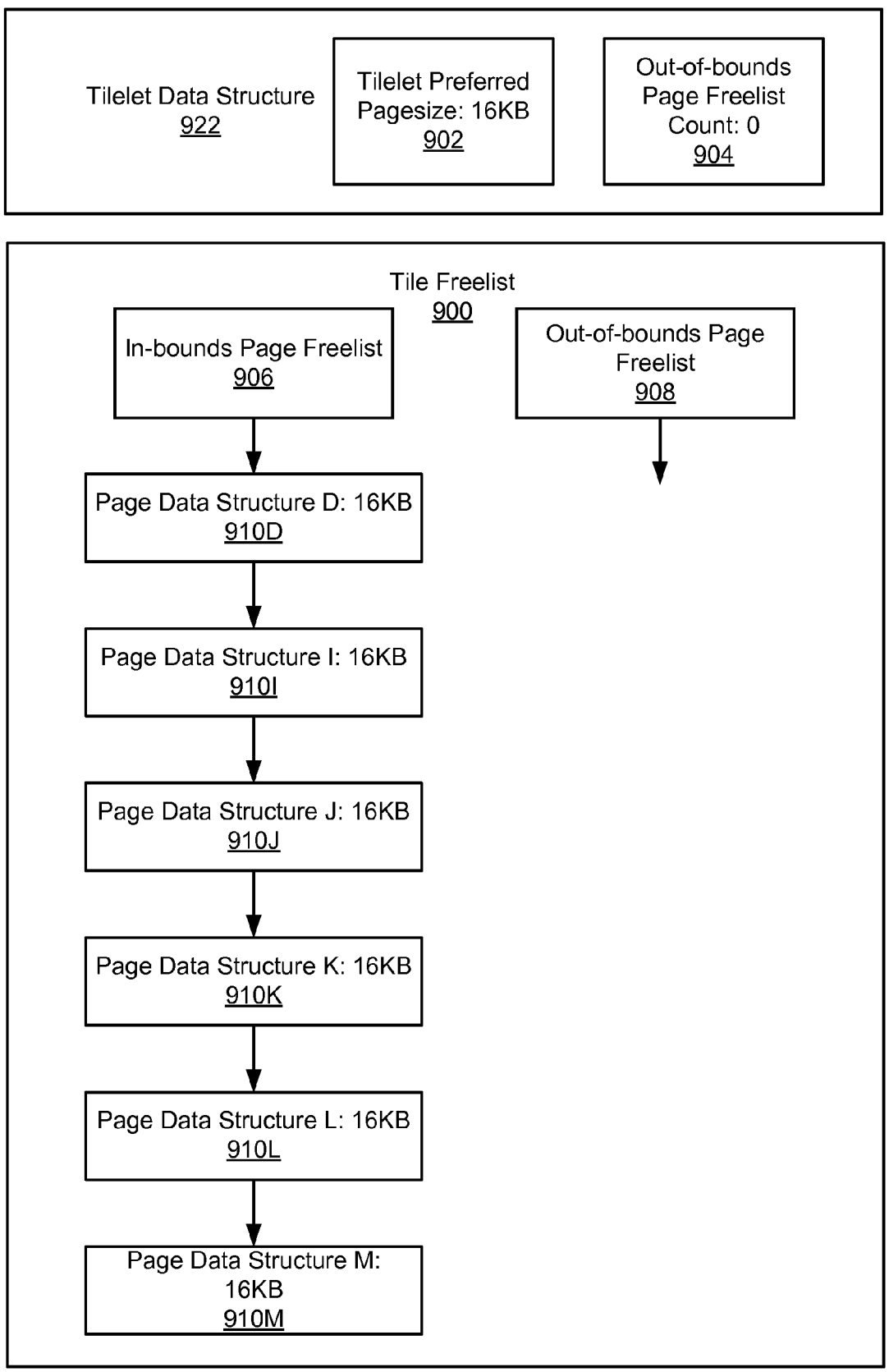

At Step 970, the newly generated page data structures (page data structure I (910I) page data structure J (910J), page data structure K (910K), page data structure L (910L), and page data structure M (910M)) are added to the tile freelist (900). FIG. 9H depicts the tile freelist (900) after the page data structures corresponding to the coalesced pages has been removed, and the newly generated page data structures have been added. Page I (920I), page J (920J), page K (920K), page L (920L), and page M (920M) are each 16 kB, and match the tilelet preferred pagesize (902) for the tilelet. Therefore, page data structure I (910I) page data structure J (910J), page data structure K (910K), page data structure L (910L), and page data structure M (910M) are added to the in-bounds page freelist (906).

Embodiments of the invention may be used to create a system where portions of memory can be dynamically shifted from including a large amount of pages of one size, to including a large amount of pages of another size. Embodiments of the invention may allow a system to dynamically create different types of pages depending on the current or projected needs of the system.

Figure 10:
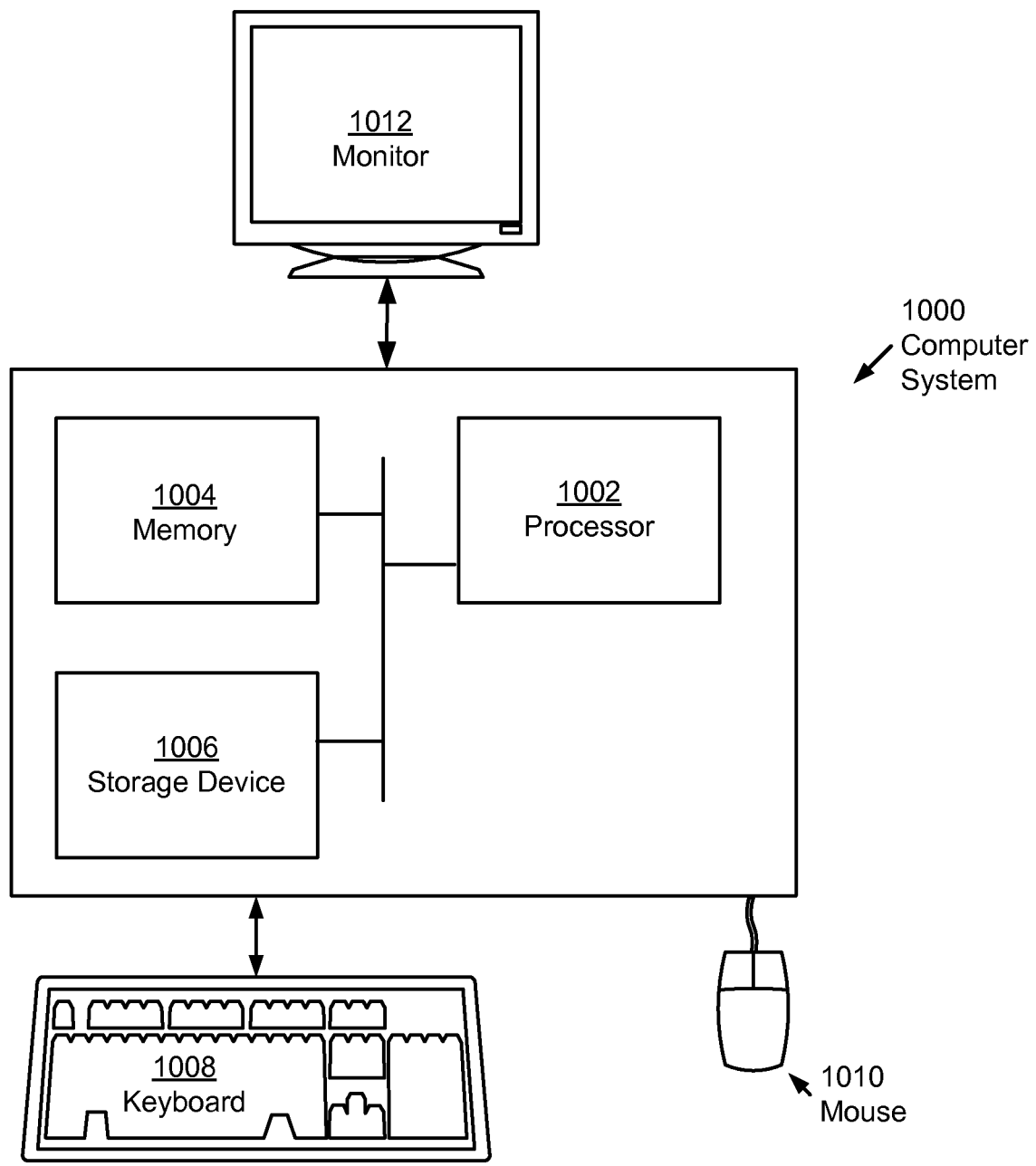
FIG. 10 shows a computer system in accordance with one or more embodiments of the invention.

Embodiments of the invention may be implemented on virtually any type of computer regardless of the platform being used. For example, as shown in FIG. 10, a computer system (1000) includes one or more processor(s) (1002) such as a central processing unit (CPU) or other hardware processor(s), associated memory (1004) (e.g., random access memory (RAM), cache memory, flash memory, etc.), a storage device (1006) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (1002) is hardware. For example, the processor may be an integrated circuit. The computer system (1000) may also include input means, such as a keyboard (1008), a mouse (1010), or a microphone (not shown). Further, the computer system (1000) may include output means, such as a monitor (1012) (e.g., a liquid crystal display (LCD), a plasma display, or cathode ray tube (CRT) monitor). The computer system (1000) may be connected to a network (1014) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (1000) includes at least the minimal processing, input, and/or output means necessary to practice embodiments of the invention.

Further, those skilled in the art will appreciate that one or more elements of the aforementioned computer system (1000) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code may be used to perform embodiments of the invention. The software instructions in the form of computer readable code may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a memory comprising a first tilelet on a first tile;
   a tilelet data structure entry comprising a first tilelet preferred pagesize assigned to a first value;
   a first tile freelist for the first tile, comprising:
   a first tile in-bounds page freelist; and
   a first tile out-of-bounds page freelist comprising a plurality of out-of-bounds page data structures, wherein each of the plurality of out-of-bounds page data structures is associated with a physical page; and
   an allocation subsystem configured to:
   detect that a first physical page on the first tilelet is freed;
   store, in the first tile in-bounds page freelist, a first page data structure corresponding to the first physical page based on a determination that a size of the first physical page matches the first tilelet preferred pagesize;
   detect that a second physical page on the first tilelet is freed;
   store, in the first tile out-of-bounds page freelist, a second page data structure corresponding to the second physical page based on a determination that a size of the second physical page does not match the first tilelet preferred pagesize; and
   coalesce the memory using the second page and at least one of the plurality of physical pages associated with the plurality of out-of-bounds page data structures into a third physical page, wherein a size of the third physical page matches the first tilelet preferred pagesize.

2. The system of claim 1,
   wherein the system further comprises:
   a second tile comprising a second tilelet, and
   a second tile freelist, corresponding to the second tile, comprising:
   a second tile in-bounds page freelist; and
   a second tile out-of-bounds page freelist; and
   wherein the allocation subsystem is further configured to:

receive, from a thread, a request for a freed physical page, wherein the request specifies a size of the freed physical page;

make a first determination that the first tile in-bounds page freelist and the second tile in-bounds page freelist do not comprise a freed page data structure corresponding to the freed physical page that satisfies the request;

in response to the first determination, make a second determination that the first page data structure in the first tile out-of-bounds page freelist satisfies the request; and allocate, to the thread in response to the second determination, the first physical page corresponding to the first page data structure in the first tile out-of-bounds page freelist.

3. The system of claim 2, wherein the memory further comprises a memgroup, wherein the memgroup comprises the first tile and the second tile.

4. The system of claim 3, wherein the system comprises additional memory, wherein the additional memory and the memory reside on a node of the system.

5. The system of claim 1, wherein the tilelet data structure entry further comprises an out-of-bounds page freelist count indicating an amount of freed memory on the first tilelet that is stored in the first tile out-of-bounds page freelist.

6. The system of claim 5, wherein coalescing comprises:
selecting the first tilelet for coalescing based on a determination that the out-of-bounds page freelist count exceeds a threshold.

7. The system of claim 1, wherein the allocation subsystem is further configured to:
remove, from the first tile out-of-bounds page freelist, the second page data structure corresponding to the second physical page in response to the coalescing; and
store, in the first tile in-bounds page freelist, a third page data structure corresponding to the third physical page.

8. The system of claim 7,
wherein the first tile out-of-bounds page freelist further comprises a fourth page data structure, and
wherein the allocation subsystem is further configured to:
receive a request to reassign the first tilelet preferred page size to a second value;
reassign, based on the request, the preferred page size to the second value;
move, based on reassigning the preferred page size to the second value, the first page data structure and the third page data structure to the first tile out-of-bounds page freelist; and
move the fourth page data structure to the first tile in-bounds page freelist based on a determination that a size of the fourth page data structure matches the second value.

9. The system of claim 1, wherein coalescing comprises:
determining that an active physical page exists between the second physical page and one of the plurality of physical pages corresponding to at least one of the plurality of out-of-bounds page data structures; and
freeing the active physical page by relocating contents of the active physical page to a second tilelet on the memory to obtain a freed physical page,
wherein a contiguous range of memory comprises the second physical page, the one of the plurality of physical pages, and the freed physical page.

10. The system of claim 1, wherein the first tilelet is a contiguous region of memory comprising a plurality of freed physical pages and a plurality of active pages.

11. The system of claim 1, wherein the system has a non-uniform memory access architecture comprising a plurality of nodes, and wherein the memory resides on one of the plurality of nodes.

12. The system of claim 1, wherein the first tile in-bounds page freelist and the first tile out-of-bounds page freelist are implemented as double-linked list indexed by node.

13. A method for managing memory on a system comprising:
detecting that a first physical page on a first tilelet is freed, wherein the first tilelet is on a first tile within the memory, wherein the first tilelet is associated with a first tilelet data structure entry comprising a first tilelet preferred pagesize assigned to a first value, and
wherein the first tile is associated with a first tile freelist comprising:
a first tile in-bounds page freelist; and
a first tile out-of-bounds page freelist comprising a plurality of out-of-bounds page data structures, wherein each of the plurality of out-of-bounds page data structures is associated with a physical page;
storing, in the first tile in-bounds page freelist, a first page data structure corresponding to the first physical page based on a determination that a size of the first physical page matches the first tilelet preferred pagesize;
detecting that a second physical page on the first tilelet is freed;
storing, in the first tile out-of-bounds page freelist, a second page data structure corresponding to the second physical page based on a determination that a size of the second physical page does not match the first tilelet preferred pagesize; and
coalescing the memory using the second page and at least one of the plurality of physical pages associated with the plurality of out-of-bounds page data structures into a third physical page, wherein a size of the third physical page matches the first tilelet preferred pagesize.

14. The method of claim 13, further comprising:
receiving, from a thread, a request for a freed physical page, wherein the request specifies a size of the freed physical page;
obtaining the first tile freelist and a second tile freelist associated with a second tile on the memory, wherein the second tile freelist comprises:
a second tile in-bounds page freelist, and
a second tile out-of-bounds page freelist;
making a first determination that the first tile in-bounds page freelist and a second tile in-bounds page freelist do not comprise a freed page data structure corresponding to the freed physical page that satisfies the request;
in response to the first determination, making a second determination that the first page data structure in the first tile out-of-bounds page freelist satisfies the request; and
allocating, to the thread in response to the second determination, the first physical page corresponding to the first page data structure in the first out-of-bounds page freelist.

15. The method of claim 13, further comprising:
removing, from the first tile out-of-bounds page freelist, the second page data structure corresponding to the second physical page; and
storing, in the first tile in-bounds page freelist, a third page data structure corresponding to the third physical page, wherein the third physical page is the contiguous region of memory.

16. The method of claim 13, wherein coalescing a contiguous region of memory comprises:

determining that an active physical page exists between the second physical page and one of the plurality of physical pages corresponding to at least one of the plurality of out-of-bounds page data structures; and freeing the active physical page by relocating contents of the active physical page to a second tilelet on the memory to obtain a freed physical page, wherein a contiguous range of memory comprises the second physical page, the one of the plurality of physical pages, and the freed physical page.

17. A non-transitory computer readable medium comprising instructions that, when executed by a processor, perform a method for managing memory on a system, the method comprising:

detecting that a first physical page on a first tilelet is freed, wherein the first tilelet is on a first tile within the memory, wherein the first tilelet is associated with a first tilelet data structure entry comprising a first tilelet preferred pagesize assigned to a first value, and wherein the first tile is associated with a first tile freelist comprising:

a first tile in-bounds page freelist; and a first tile out-of-bounds page freelist comprising a plurality of out-of-bounds page data structures, wherein each of the plurality of out-of-bounds page data structures is associated with a physical page;

storing, in the first tile in-bounds page freelist, a first page data structure corresponding to the first physical page based on a determination that a size of the first physical page matches the first tilelet preferred pagesize;

detecting that a second physical page on the first tilelet is freed;

storing, in the first tile out-of-bounds page freelist, a second page data structure corresponding to the second physical page based on a determination that a size of the second physical page does not match the first tilelet preferred pagesize; and coalescing the memory using the second page and at least one of the plurality of physical pages associated with the plurality of out-of-bounds page data structures into a third physical page, wherein a size of the third physical page matches the first tilelet preferred pagesize.

18. The non-transitory computer readable medium of claim 17, wherein the memory further comprises a plurality of memgroups, wherein a first one of the plurality of memgroups resides on a first node of the system, wherein a second one of the plurality of memgroups resides on a second node of the system, and wherein the first one of the plurality of memgroups comprises the first tilelet.

19. The non-transitory computer readable medium of claim 17, the method further comprising:

receiving, from a thread, a request for a freed physical page, wherein the request specifies a size of the freed physical page;

obtaining the first tile freelist and a second tile freelist associated with a second tile on the memory, wherein the second tile freelist comprises:

a second tile in-bounds page freelist, and a second tile out-of-bounds page freelist;

making a first determination that the first tile in-bounds page freelist and a second tile in-bounds page freelist do not comprise a freed page data structure corresponding to the freed physical page that satisfies the request;

in response to the first determination, making a second determination that the first page data structure in the first tile out-of-bounds page freelist satisfies the request; and allocating, to the thread in response to the second determination, the first physical page corresponding to the first page data structure in the first out-of-bounds page freelist.

20. The non-transitory computer readable medium of claim 17, wherein the tilelet data structure entry further comprises an out-of-bounds page freelist count indicating an amount of freed memory on the first tilelet and stored in the first tile out-of-bounds page freelist, and wherein coalescing the contiguous region of memory comprises:

selecting the first tilelet for coalescing based on a determination that the out-of-bounds page freelist count exceeds a threshold.

\* \* \* \* \*